United States Patent [19]
Richmond

[11] Patent Number: 5,163,136
[45] Date of Patent: Nov. 10, 1992

[54] SYSTEM FOR ASSEMBLING PLAYBACK DATA FRAMES USING INDEXED FRAME BUFFER GROUP ACCORDING TO LOGICAL FRAME NUMBERS IN VALID SUBCODE OR FRAME HEADER

[75] Inventor: Robert C. Richmond, Laguna Hills, Calif.

[73] Assignee: Archive Corporation, Costa Mesa, Calif.

[21] Appl. No.: 436,570

[22] Filed: Nov. 13, 1989

[51] Int. Cl.5 ................... G06F 13/00; G06F 11/08; G11B 5/09

[52] U.S. Cl. .................. 395/275; 364/236.3; 364/239.3; 364/248.2; 364/266.3; 364/284.1; 364/952.4; 364/946.0; 364/939.3; 364/139.7; 364/DIG. 1; 360/48; 395/200

[58] Field of Search ............ 395/250, 275; 360/48; 364/200 MS File, 900 MS File

[56] References Cited

U.S. PATENT DOCUMENTS

| | | | |
|---|---|---|---|
| 4,435,762 | 3/1984 | Milligan et al. | 364/200 |
| 4,689,767 | 8/1987 | Stevenson et al. | 364/900 |
| 4,805,046 | 2/1989 | Kuroki et al. | 360/49 |
| 4,837,767 | 6/1989 | Hartwell et al. | 371/49 |
| 4,862,443 | 8/1989 | Tsuji et al. | 369/59 |
| 4,899,232 | 2/1990 | Odaka et al. | 360/48 |
| 4,931,885 | 6/1990 | Mester et al. | 360/48 |
| 4,935,824 | 6/1990 | Nakano et al. | 360/48 |
| 4,974,189 | 11/1990 | Russon et al. | 364/900 |
| 5,012,459 | 4/1991 | Odaka et al. | 360/32 |
| 5,023,718 | 6/1991 | Soloff | 358/160 |
| 5,029,022 | 7/1991 | Odaka et al. | 360/48 |
| 5,091,805 | 2/1992 | Odaka et al. | 360/53 |

OTHER PUBLICATIONS

Translation of "Sub Code Format and Its Utilization," Adachi, Tatsuya, Matsushita Electronics Industry, Ltd., Radio Research Laboratory, JAS Journal, Nov. 1987, DAT Technology Information Series.

"All present and correct," E. Tan and M. Dunstan, Systems International, Feb. 1988, Reed Business Publishing, Quadrant, Sutton, Surrey SM2 5AS.

"DAT data format takes shape," P. Bramhall and M. Dunstan, Systems International, Mar., 1988, Reed Business Publishing, Quadrant, Sutton, Surrey SM2 5AS.

"DAT for data," J. Young, E. Tan, Systems International, Reed Business Publishing, Quadrant, Sutton, Surrey SM2 5AS.

"Isn't DAT Special?" B. Vermeulen and M. Law, Mini-Micro Systems, Dec. 1988, pp. 84–89.

"Designing a Data Storage Format for Digital Audio Tape (DAT)—Preliminary Draft—Revision 0.1," K. Odaka, E. T. Tan, B. Vermeulen, Preliminary Draft, Revision 0.1, Aug. 25, 1988.

"Digital audio tape for data storage," E. Tan and B. Vermeulen, IEEE Spectrum, Oct. 1989, pp. 34–38.

3rd Draft—Proposed American National Standard Helical-Scan Digital Computer Tape Cartridge 3.81 mm (0.150 in) for Information Interchange, Jan. 31, 1989.

5th Draft—Proposed American National Standard Helical-Scan Digital Computer Tape Cartridge 3.81 mm (0.150 in) for Information Interchange, Oct. 31, 1989.

7th Draft—Proposed American National Standard Helical-Scan Digital Computer Tape Cartridge 3.81 mm (0.150 in) Digital Data Storage (DDS) Recorded Format for Information Interchange, Apr. 9, 1990.

*Primary Examiner*—Thomas C. Lee
*Assistant Examiner*—Ken S. Kim
*Attorney, Agent, or Firm*—Roberts and Quiogue

[57] ABSTRACT

Apparatus and method for assembling data read from a data storage DAT tape into data groups. A tape data processing circuit responsive to the playback of DAT tape for provides for each frame a serial frame information output including a frame header and frame data, and an associated subcode information output, the subcode information output being available in advance of the associated frame information. A processor responsive to the subcode information checks the validity of the subcode information and determines the destination group memory locations of the associated frame data, such destination group memory locations being group frame locations specified pursuant to valid subcode information or temporary storage areas for frames having invalid subcode information. DMA circuitry transfers the frame data to the destination group memory locations. The processor further checks the error status of the stored frame data, verifies the group memory locations specified by the subcode information for frame data stored pursuant to valid subcode information, relocates frame data stored in temporary storage areas pursuant to frame location information contained in the frame headers under certain conditions, and updates a Bad Track Table to indicate the status of the received frame data stored in the group memory.

3 Claims, 6 Drawing Sheets

INDIVIDUAL TRACK FORMAT

GROUP BUFFER STRUCTURE IN MEMORY

FIG. 4

4 BYTES
HEADER AREA

FIG. 5

BAD TRACK TABLE

FIG. 2

SYSTEM FOR ASSEMBLING PLAYBACK DATA FRAMES USING INDEXED FRAME BUFFER GROUP ACCORDING TO LOGICAL FRAME NUMBERS IN VALID SUBCODE OR FRAME HEADER

BACKGROUND OF THE INVENTION

The disclosed invention is directed generally to computer data storage digital audio tape (DAT) systems for digital storage, and is directed more particularly to techniques for assembling data read from a DAT tape into data groups with reduced buffer management.

Digital audio tape (DAT) technology, which was developed for audio programming, has been adapted for storage of computer data. An example of a format for the storage of computer data utilizing DAT technology is the American National Standards Institute (ANSI) Digital Data Storage (DDS) standard, presently in draft form ("PROPOSED AMERICAN NATIONAL STANDARD HELICAL-SCAN DIGITAL COMPUTER TAPE CARTRIDGE 381 mm (0.150 in) FOR INFORMATION INTERCHANGE," ASC X3 Project No. 668-D).

The characteristics that have made DAT technology attractive for computer data storage include high capacity, high transfer rate capability, relatively small media size and low media cost, and the adaptability of DAT technology to conform with personal computer storage device form factors including the 5¼ and 3½ inch forms.

The use of DAT technology for storage of computer data can be achieved by application of a data storage format, such as the above-referenced ANSI DDS format, to the DAT format. In particular, the DAT physical track format is retained, but the contents of the information stored in the tracks is in accordance with the computer data storage format.

As is well known, reading a tape with a DAT system requires that the digital data stream produced by reading a computer data storage DAT tape must be organized in accordance with a predetermined formatting convention, for example, for transfer to a host computer. For example, pursuant to the ANSI DDS standard, the digital data stream must be broken into frames which are combined into groups, where a frame comprises 2 tracks and a group includes 22 or 23 frames, depending on the level of error correction implemented. The frames in a group must be arranged in an ordered sequence, which may be different from the sequence of the frames in the data stream.

In a data storage DAT tape, each frame includes a header that identifies its relative position within its group, and computer storage DAT systems typically utilize such headers with buffer management for assembling frames into groups. For example, a two step process might be used. Each frame is transferred into a distinct frame memory, and the next step is to move the frame to its proper location in a group buffer which would typically be in a separate memory. Considerations with such processing include the use of a separate frame memory having sufficient capacity to store at least two frames to allow for processing of a frame that has been completely read in while another frame is being read into the frame memory, and the complexity of the associated control hardware (e.g., parity generation, storage and checking).

SUMMARY OF THE INVENTION

It would therefore be an advantage to provide a computer data storage DAT system which has reduced buffer management complexity for assembling DAT playback data frames into data groups.

Another advantage would be to provide a computer data storage system DAT which does not require separate frame memory for assembling DAT playback data frames into data groups.

A further advantage would be to provide a computer storage DAT system which provides for the transfer of each frame read from tape directly to its proper location in the group buffer on the basis of subcode information.

The foregoing and other advantages are provided by the invention in a data group assembly circuit that includes a tape data processing circuit responsive to the playback of DAT tape for providing for each frame a serial frame information output including a frame header and frame data, and an associated subcode information output, the subcode information output being available in advance of the associated frame information. A processor responsive to the subcode information checks the validity of the subcode information and determines the destination group memory locations of the associated frame data, such destination group memory locations being group frame locations specified pursuant to valid subcode information or temporary storage areas for frames having invalid subcode information. DMA circuitry transfers the frame data to the destination group memory locations. The processor further checks the error status of the stored frame data, verifies the group memory locations specified by the subcode information for frame data stored pursuant to valid subcode information, relocates frame data stored in temporary storage areas pursuant to frame location information contained in the frame headers under certain conditions, and updates a Bad Track Table to indicate the status of the received frame data stored in the group memory.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION OF THE DISCLOSURE

In the following detailed description and in the several figures of the drawing, like elements are identified with like reference numerals.

By way of illustrative example, the disclosed invention can be implemented generally in accordance with the ANSI DDS standard referenced in the background, and the following is based upon conformation with ANSI DDS. However, it should be readily appreciated by persons skilled in the art from a reading of the subject disclosure that other recording formats can be utilized to implement the invention.

For ease of explanation, some aspects of DDS formatting that are pertinent to the invention will be briefly discussed. DDS formatting organizes data into data groups respectively having 22 or 23 frames, where each frame comprises 2 tracks.

Figure 1:
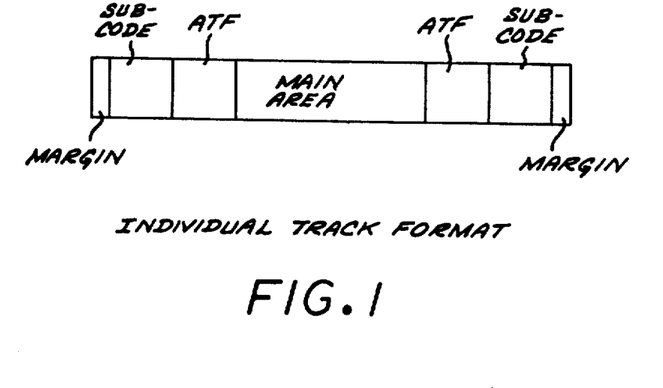
FIG. 1 is a schematic diagram illustrating the different areas on a single track of a helical scan DAT system tape.

Referring to FIG. 1, set forth therein by way of illustrative example is a schematic layout of one track of a computer data storage DDS DAT tape. A main area, which corresponds to the PCM area in DAT audio tapes, stores user data as well as data management information such as the Logical Frame Number (LFN) of the frame with which the particular track is associated. The LFN is the logical position of the frame in the associated data group, which can be different from the actual physical location of the frame due to factors such as rewrites. Further, frames can be out of sequence because of appends, re-writes, head clogs during write operations, and bad tape areas. DDS formatting supports a read-after-write technique wherein a frame identified as being a bad frame can be re-written downstream of the bad frame, and not necessarily immediately after the bad frame. In particular, the frame can be re-written after zero, one, two, three, four or five other frames have been written. The subject disclosure takes into account such read-after-write procedures.

The tape subcode areas store, among other information, the LFN of the associated frame, the Absolute Frame Count (AFC) for the associated frame, a subcode type identifier, a tape area identifier, as well as other information. The AFC represents the actual physical location of a frame in the sequence of frames on a tape.

A data group includes 22 or 23 frames, depending on whether a third level of error correction code (ECC) is utilized with the group, and group boundaries can be indicated by amble frames which have an LFN of 0, or by a frame that has an LFN of 1. However, with read-after-write, the last frames in one group could be meshed with the initial frames in the subsequent group, and the procedure for reading groups will need to recognize and properly process this circumstance.

The ATF (automatic track finding) areas contain tracking information utilized for centering the tape heads on the tracks on the tape.

Figure 2:
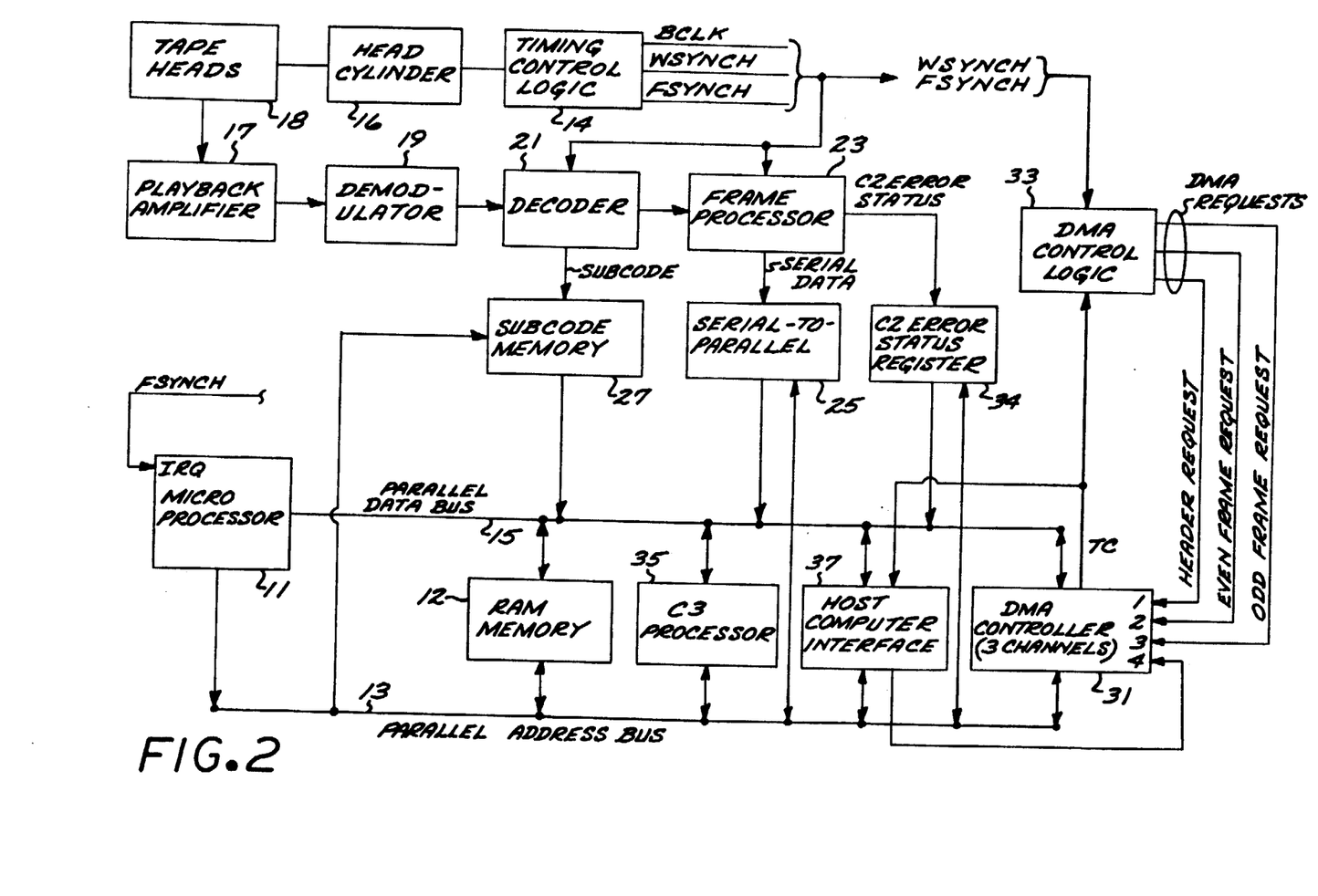
FIG. 2 is a generalized block diagram of a computer data storage DAT system in accordance with the invention.

Referring now to FIG. 2, shown therein is a generalized block diagram of read components of a computer data storage DAT system in accordance with the invention. A microprocessor 11 provides overall control via a parallel address bus 13, a parallel data bus 15, and other lines as described further herein. A random access memory 12 connected to the address bus 13 and the data bus 15 is utilized by the microprocessor 11 for data group buffering as well as other memory functions. Other components are coupled to the address and data buses, and it should be appreciated that address decoding circuitry would be utilized as appropriate. For ease of illustration such address decoders are not depicted in the block diagram of FIG. 1.

The DAT system further includes a timing logic control circuit 14 which is synchronized with the rotation of a rotating head cylinder 16 that supports read and record tape heads 18. The timing logic control 14 provides timing signals pertinent to processing and organizing the data read by the DAT system. In particular, the timing signal generator provides a frame synchronization signal FSYNCH which defines frame boundaries, a word synchronization signal WSYNCH which defines word boundaries, and a bit clock BCLK.

A tape playback amplifier 17 responsive to the read heads provides its RF playback signal to a demodulator 19 which provides an output comprising a serial bit stream that includes information from the subcode areas and the main areas of the tape. The output of the demodulator 19 is processed by a decoder 21 which provides, for example, a first level of error correction code (ECC) processing on the demodulated signal, for example the C1 ECC pursuant to the ANSI DDS standard, as well as decomposition of the demodulated data into frame information and subcode information.

The frame information output of the processor 21 is provided to a frame processor 23 which applies a second level of ECC processing, for example C2 ECC pursuant to the DDS format, and de-interleaves the frame information from the two tracks comprising a frame to provide a serial frame output. The serial frame output for each frame includes a frame header (e.g., 2 words wherein each word comprises 2 bytes) and frame data (e.g., 2878 data words) which are provided to a serial-to-parallel conversion circuit 25 for transfer to the RAM 12 by direct memory access (DMA) processing. The serial-to-parallel conversion circuit 25 is clocked by the timing signals provided by the timing logic control 14, and transforms the serial frame output into parallel frame data words.

The frame processor 27 further provides error status outputs, for example to a C2 error status register 34. In particular, the error status outputs will indicate which track includes an error, if any, that could not be corrected by C2 ECC.

The subcode information for each frame is stored by the decoder 21 in a subcode memory 27, which, for example, can be a random access memory dedicated to the decoder 21. The subcode memory 27 also stores C1 error status indicative of whether C1 processing detected any block errors that could not be corrected by C1 processing.

A four-channel DMA controller 31 is connected to the address bus 13 and the headers and data bus 15 for DMA transfer of frame data from the serial-to-parallel shift register circuit 25 to the RAM 12. A DMA control logic circuit 33 responsive to timing signals provided by the timing logic control 14 and the terminal count (TC) signal from the DMA controller 31 provides the DMA requests to the DMA controller 31.

An error correction code (ECC) processor 35, for example for providing C3 ECC processing in accordance with the ANSI DDS standard, is coupled to the parallel address bus 13 and the parallel data bus 15, and provides for ECC processing of data groups assembled in the RAM 12.

A host computer interface 37, for example in accordance with the ANSI Small Computer System Interface (SCSI) standards, is also coupled to the parallel address bus 13 and the parallel data bus 15 for transferring the data retrieved from the DAT tape to a host computer. Pursuant to known configurations, the host computer interface utilizes DMA techniques and provides DMA requests to channel 4 of the DMA controller 31. The host computer interface 37 also receives the TC signal from the DMA controller 31.

The foregoing components of the DAT read system can be partitioned as required for the particular application. For example, for use with personal computers such as the IBM AT which have DMA controllers, the microprocessor 11, the RAM 12, the address bus 13, the data bus 15, and the DMA controller 31 could comprise components of the personal computer The serial-to-parallel conversion circuit 25, the DMA control logic 33, and the ECC processor 35 would be on a plug-in peripheral interface card, and the host computer interface 37 would not be needed. The demodulator, the decoder, the subcode memory, and the frame processor would be included, for example, with the drive mechanism.

By way of further alternative, for use with a host computer interface, for example, in accordance with the ANSI SCSI standards, the microprocessor 11, the RAM 12, the address bus 13, and other related components would be part of a dedicated controller. The dedicated controller could be housed with the drive mechanism, for example.

Figure 3:
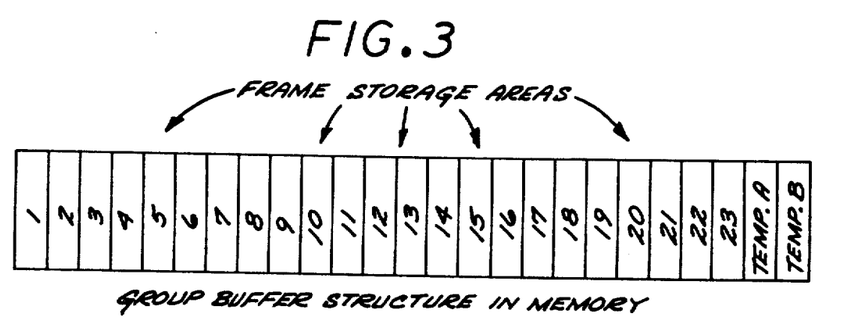
FIG. 3 is a schematic illustration depicting a group buffer utilized in the computer data storage DAT system of FIG. 2.

Referring now to FIG. 3, schematically shown therein is the logical organization of a data group buffer 100 in the RAM 12 for storing frame data (without frame headers) for a 23 frame group, for the illustrative example wherein an ECC frame is included in accordance with the ANSI DDS standard. The group buffer 100 also includes temporary frame storage locations A and B which are utilized in the event of bad tracks, invalid subcodes, or C2 ECC errors, as described more fully herein. Each frame area is 5,756 bytes of memory, and is identified by frame number. By way of illustrative example, three (3) to seven (7) data group buffers can be utilized, depending upon the processing requirements and implementation.

Figure 4:
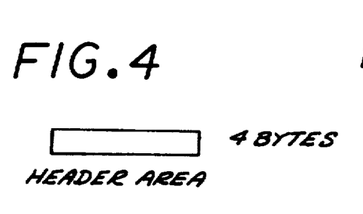
FIG. 4 is a schematic illustration depicting a frame header storage area as utilized in the computer data storage DAT system of FIG. 2.

Referring now to FIG. 4, shown therein is a four byte header storage area in the RAM 12 which is utilized for storage of the headers of the frames in a data group. Depending upon implementation, only a few header storage areas are utilized as required.

Figure 5:
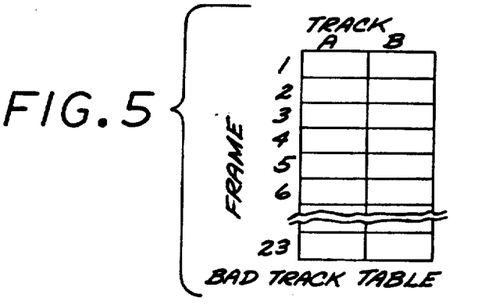
FIG. 5 is a schematic illustration depicting a Bad Track Table as utilized in the computer data storage DAT system of FIG. 2.

Referring now to FIG. 5, shown therein is the logical organization of a Bad Track Table (BTT) in the RAM 12 which is utilized for storing track status codes indicative of the status of each of the 46 tracks of a data group being processed. The entry for each track comprises 4 bits, for example, which can be coded to include the following:

0 = not received
1 = received, no error
2 = received, error
3 = good track replaced by bad track A Bad Track Table is utilized to determine whether re-read of a group is necessary, and for further functions as described herein. Prior to use for a particular group, the entries of a Bad Track Table are initialized to indicate that no tracks have been received. A plurality of Bad Track Tables are utilized as appropriate.

Figure 6:
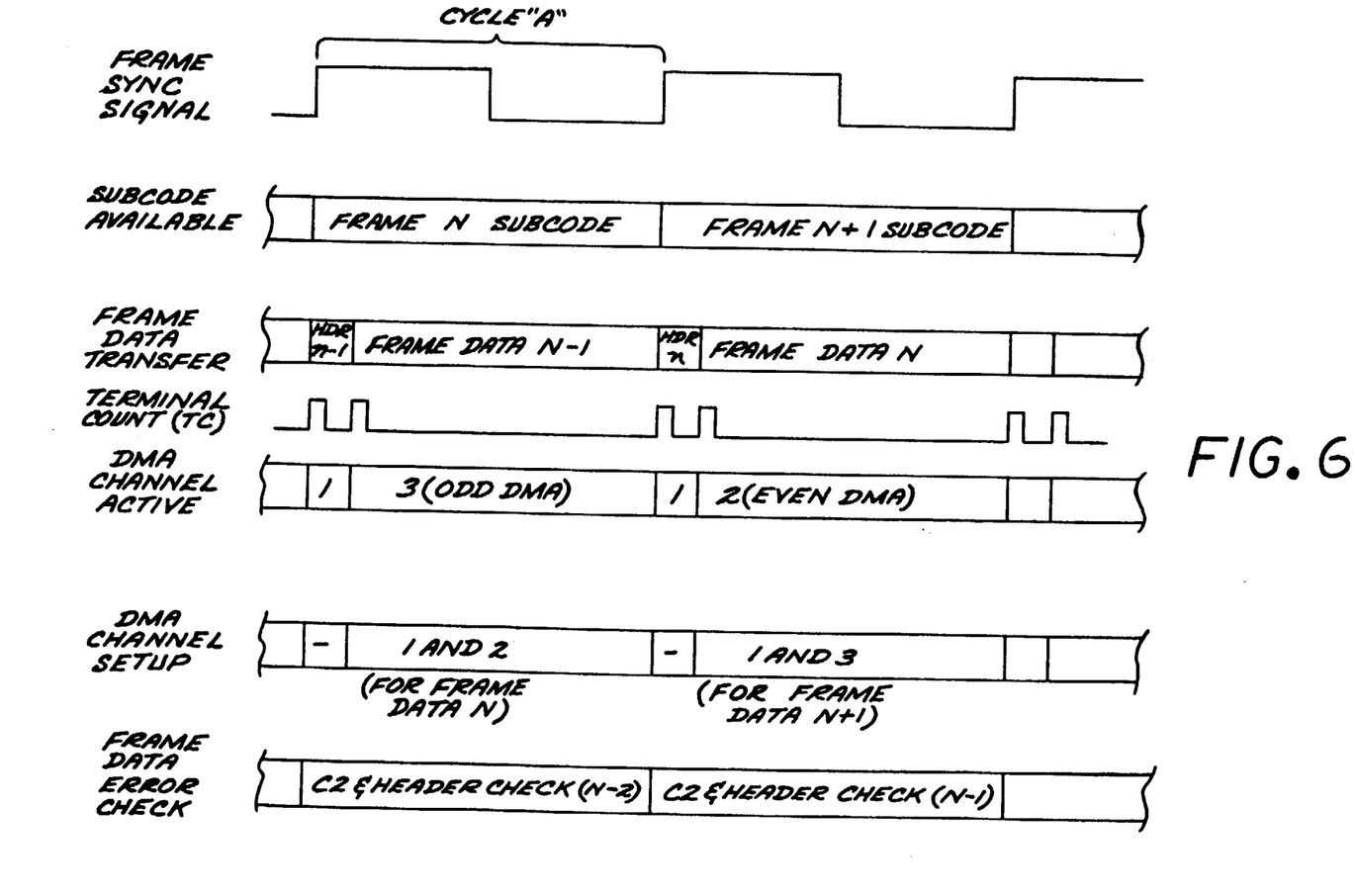
FIG. 6 is a generalized timing diagram depicting the timing of certain functions provided by the computer data storage DAT system of FIG. 2.

Referring now to FIG. 6, shown therein is a timing diagram showing, relative to the frame synchronization signal FSYNCH, the contents of the subcode memory 21, the serial frame output of the frame processor 15, the status of the terminal count signal TC, the frame data being transferred by DMA, the DMA channel setup, and the error checking functions provided by the microprocessor 11.

During the particular cycle "A" of the synchronization signal FSYNCH, the subcode information for the frame N is available and is accessed by the microprocessor for processing, as discussed in further detail herein, and the frame header and data for the preceding frame N-1 is being transferred by DMA from the serial-to-parallel conversion circuit 25 to the RAM 12, starting with the frame header. Further during the cycle "A," the DMA channel 1 is active until the frame header for the frame N-1 has been transferred to a frame header area in the RAM (as indicated by the Terminal Count signal TC from the DMA controller 31), and then the DMA channel 3 becomes active (based on N being even) for transfer of the frame data to the group buffer area. While the DMA channel 3 is active, the DMA channels 1 and 2 will be set up with address and transfer count information by the microprocessor 11. Further during the FSYNCH cycle "A," the microprocessor 11 checks the results of the C2 ECC processing to determine whether there is a bad track in the frame N-2, which has already been stored in a group buffer in the RAM 12, and also checks the LFNs of the header for the frame N-2 as detailed further herein.

During a given cycle of the synchronization signal FSYNCH, the subcode check, the C2 and header check, and the DMA set up are performed by the microprocessor pursuant to an interrupt generated by the synchronization signal FSYNCH, while the DMA transfer is performed by the DMA controller. The functions provided by the microprocessor are performed sequentially, and the timing diagram of FIG. 6 is intended only to indicate that a given cycle of the synchronization signal FSYNCH defines a time window during which such functions are to be performed.

From the foregoing, it should be appreciated that during a given FSYNCH cycle, three successive frames are in different processing stages and are being processed in a pipeline manner, with the DMA channels 2 and 3 alternating from one cycle to another so as to maintain the continuous transfer of frame data to group buffers in the RAM 12. It should also be appreciated that the processing of each frame requires three (3) cycles of the frame synchronization signal FSYNCH, with predetermined procedures taking place during each cycle.

By way of illustrative example, DMA transfers are controlled such that the terminal count signal TC is indirectly slaved to the synchronization signal FSYNCH, and the signal TC is utilized by the DMA control logic to make the appropriate DMA requests. Pursuant to such DMA control, however, it should be appreciated that initialization will be based on the frame synchronization signal FSYNCH, and will involve "dummy" DMA transfers as controlled by the microprocessor 11 until the target group is reached.

The procedure for reading and storing data groups is generally as follows for a given frame. As discussed above, a frame is processed over three successive cycles of the frame synchronization signal FSYNCH, with different procedures occurring during a given cycle. As the playback of each frame is received by the processor 21, the subcode information is transferred to the subcode memory while the frame data continues to be processed, which allows the subcode information to be checked and examined before the corresponding frame data becomes available at the output of the frame processor 27. In particular, the subcode data is examined during the first FSYNCH cycle pertinent to a given frame to determine whether at least one block of the repeated subcode data in the two tracks comprising the frame meets the following criteria:

C1 ECC processing check indicates no error
parity check indicates no error
subcode type identifier indicates data area
AFC is greater than the previous good subcode AFC.

These checks are provided to reduce the probability of an undetected subcode error.

If the available subcode information from each track meets the foregoing criteria, but the verified subcode information from one track differs from that of the other track, then subcode data for the current frame is considered invalid (because both tracks must be from the same frame and subcode information from the 2 tracks should be identical).

If there is no subcode error, the Logical Frame Number (LFN) contained in the subcode information is used as an index into the group buffer utilized for the particular group being processed. The DMA transfer takes place during the second FSYNCH cycle pertinent to the given frame. The DMA channel currently idle (odd or even) and the header DMA channel are set to direct the next incoming frame to the address which has been calculated by the microprocessor.

After a frame has been read into a group buffer, during the third FSYNCH cycle pertinent to the given frame, a check is made to determine if there were any C2 detected errors. Also during the third FSYNCH cycle for the given frame, the frame header (which includes the LFN information from each of the tracks comprising the frame), is examined to determine whether the header LFN's match the subcode LFNs which were previously determined to be identical. If the header LFNs are the same as the subcode LFNs, and there is no C2 error, then the Bad Track Table entry for that frame is updated to indicate that a good frame has been received. (The BTT was first initialized to indicate that no tracks were received).

If the C2 error check indicates an error, the BTT entries are checked to see if the just read frame in error has overwritten a frame which was previously correctly read into the same storage area. If a prior good frame was just replaced with a bad frame, the AFC of the frame just written to the group buffer is saved and the BTT is updated. This may be used to recover a good copy of the frame during a subsequent "modified" re-read attempt, described below, wherein a frame matching a saved AFC is processed as having an invalid subcode so that it will not be used to over-write a good frame.

If the subcode information is invalid, then the LFN cannot be reliably determined until after the frame has been read to memory. So the frame is directed to one of the two Temporary Frame Storage areas in the group buffer. Either area may be used, so long as it is not otherwise in use. (In the case of two successive frames with subcode errors, both areas will be needed.)

After the frame data has been read to the Temporary Frame Storage area, the C2 error status is checked. The header is also checked to determine that both tracks comprising the frame have the same LFN. If the header LFNs agree, and there is no C2 error, the frame is moved to its correct storage area in the group buffer (as determined by the header LFN). The move is done at a relatively high speed so that it is complete before the next frame has been stored. (During the move, another frame may be incoming to any one of the other frame storage areas.) For example, the microprocessor 11 may execute a MOVE STRING instruction to perform a memory-to-memory move at high speed. Also, the Bad Track Table entry for the frame that was moved is updated to indicate receipt of a good frame. In this manner, groups may be assembled without the use of subcode information.

If a single track is in error in a frame determined to have invalid subcode information, then the Bad Track Table entry for the LFN identified by the good track is checked. If no prior track is present, the just-received frame is moved to its location in the group buffer being utilized for this group and the BTT is updated. Otherwise, if the track LFNs differ, or a C2 ECC error is detected, the present frame is ignored, and the Temporary Frame Storage area may be re-used for a subsequent frame.

By way of particular example, in accordance with the re-write rules of the DDS format, assembling of the frames for the current group is completed when any of these conditions is detected using valid subcode information:

A frame from the next group in sequence has been read, and its LFN is >or=6.
The current frame's AFC is >or=the AFC+6 of the last correctly received final frame (last frame) in the current group.
Six amble frames have been received.
An End of Data (EOD) marker is detected.

Handling of re-write sequences which contain frames from two groups, and other details of traversing group boundaries (such as handling multiple group buffers) are done in a straightforward manner. Subcode information can used to perform those functions, if available.

If a frame with a LFN of 12 or greater has been correctly received, then further frames with LFNs of one to six will not be accepted into the current group. This eliminates the possibility of the first frames from the following group being accepted as frames from the current group (due to the rewrite capability with the ANSI DDS standard, detection of a possible rewrite sequence requires reading at least six frames beyond the end of the current group).

The rejected frames will be treated as frames from the next group. They may be directed to an appropriate group data buffer area for processing, or discarded, depending on implementation.

After a group has been read (as determined by the above criteria), a check is made to determine if another read pass is necessary. If a third level of error checking is used, for example, C3 ECC in the DDS format, one of two bad tracks may be corrected, and so a re-read is unnecessary. If no C3 ECC is used, then all frames must be read correctly. The Bad Track Table is examined for the presence of bad tracks, and a decision to re-read or not re-read, according to the appropriate criteria.

When a re-read pass is made, the previously read good frames are saved, so that only the erroneous frames need to be recovered. Thus, not all frames must be read correctly in any single read pass. However, the incoming subcode and frame data are processed in the same manner as in the original read pass.

If successive re-reads fail to recover all the necessary frames, a "modified re-read" may be performed. This is used to ignore the defective final copy of a repeated frame, in the case where an earlier copy had been correctly received. This is expected to happen rarely, since the last copy of a rewritten frame should be verified as good by a read-after-write check.

In a modified re-read, any frames which contain a valid subcode AFC value matching one of the previously saved AFCs is treated as if it has an invalid subcode. This prevents the defective frame identified by the saved AFC from overwriting a previous good copy.

In the normal case without subcode or frame data errors, all frames in each group are directed to their correct storage areas, without being moved from the Temporary Storage area and without re-read passes.

In the infrequent case of not all frames being read in the first pass, successive re-read passes can be made to accumulate good frames during multiple group reads.

In the worst case of no valid subcode on any frame, every frame will be read into the Temporary Frame Storage area, then moved to its correct storage area if the frame data is good. Thus, this procedure properly stores frame data in the group buffer even if no subcode information is present.

Spurious frames between groups and incorrectly recorded frames are eliminated by allowing a later copy of a frame to replace an early copy. If the later, originally correctly recorded copy becomes unreadable, a previous copy can be used during a later re-read attempt using "modified" re-reads as previously described. This also corrects the unlikely event that subcode data had an undetected error.

An extensive section of bad or damaged tape (with little or no valid subcode and little or no good frame data) can be correctly handled because the reading pass continues until the detection of good frames in a subsequent recorded area.

Figure 7:
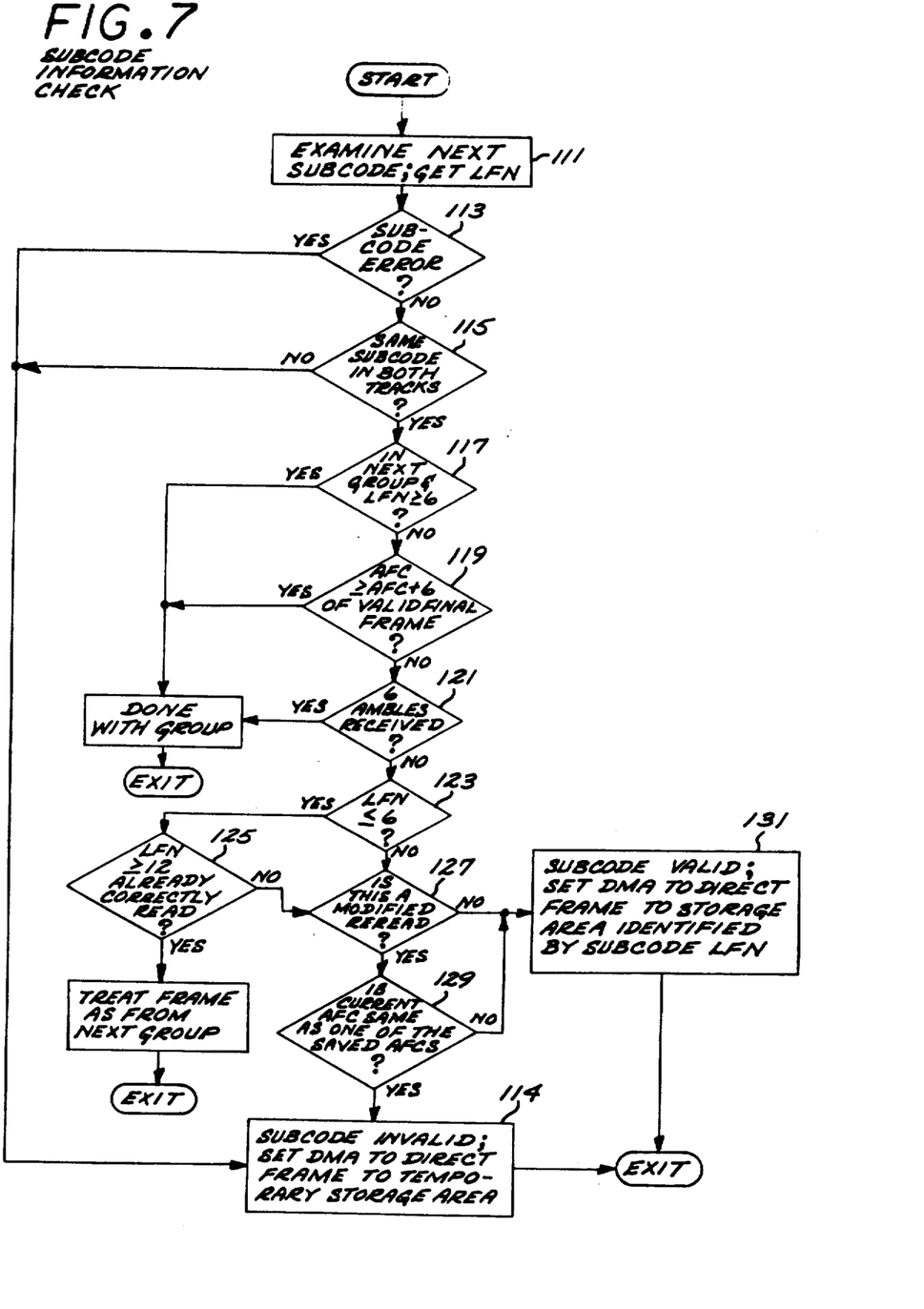
FIG. 7 is a flow diagram of a process utilized by the computer storage DAT system of FIG. 2 for checking subcode information.

Referring now to FIG. 7, shown therein is a process in accordance with the invention for checking subcode information, which is executed pursuant to an interrupt generated by FSYNCH.

At 111 the Logical Frame Number (LFN) of the frame whose subcode information is available is read from the subcode memory 27. At 113 a determination is made as to whether the subcode information contains an error, checking for example that the C1 ECC processing by the processor 21 did not indicate an error, that parity check indicates no error, that the subcode type identifier indicates data area, and that the Absolute Frame Count (AFC) is greater than the previous valid subcode AFC. If the subcode information contains an error, then at 114 the DMA controller 31 is set up to direct the frame data associated with the subcode information just processed to one of the temporary frame storage areas. The process is then exited.

If the determination at 113 is no, the subcode data does not contain an error, a determination is made at 115 as to whether the LFN's of the subcode information for both tracks of a frame are the same. If no, control transfers to 114, discussed above, for setting up the DMA controller to direct the frame data to one of the temporary storage areas.

If the determination at 115 is yes, the subcode LFN's for the two tracks of a frame are the same, a determination is made at 117 as to whether it was previously determined that processing had extended into the next group (discussed below) and the subcode LFN is greater than or equal to six. If yes, reading of the present data group is complete and the process is exited. If the determination at 117 is no, a determination is made at 119 as to whether the subcode AFC is greater than or equal to 6 plus the AFC of the valid final frame in the data group. (A valid final frame in a group is a correctly received frame 22 or 23, depending on implementation). If yes, reading of the present data group is complete. If the determination at 119 is no, a determination is made at 121 as to whether 6 successive ambles have been received. If yes, reading of the present data group is complete. If the determination at 121 is no, 6 successive ambles have not been received, a determination is made at 123 as to whether the subcode LFN is less than or equal to 6. If no, processing continues at 127.

If the determination at 123 is yes, the subcode LFN is less than or equal to 6, a determination is made at 125 as to whether a frame having an LFN greater than or equal to 12 has already been correctly received for the present group. If yes, the present frame is regarded as being for the next group and is buffered or discarded as appropriate, and the process is exited. If the determination at 125 is no, processing continues at 127.

At 127 a determination is made as to whether the present subcode information is from a modified re-read, discussed above. If no, processing continues with 131. If the determination at 127 is yes, the present data is from a modified re-read, a determination is made at 129 as to whether the current AFC matches the AFC of a bad frame saved from a prior read. If no, processing continues at 131. If the determination at 129 is yes, the present AFC matches the AFC of a previously saved bad frame, control transfers to 114 for set up of the DMA controller to transfer the frame information to one of the temporary frame storage areas. This prevents overwriting of a good frame in the group buffer since the AFC had been previously saved to indicate that a good frame had been overwritten with the bad frame having the saved AFC.

At 131 the microprocessor 11 instructs the DMA controller to direct the frame data to the locations in the group buffer starting at the address defined by the subcode LFN. The subcode check process is the exited.

Figure 8:
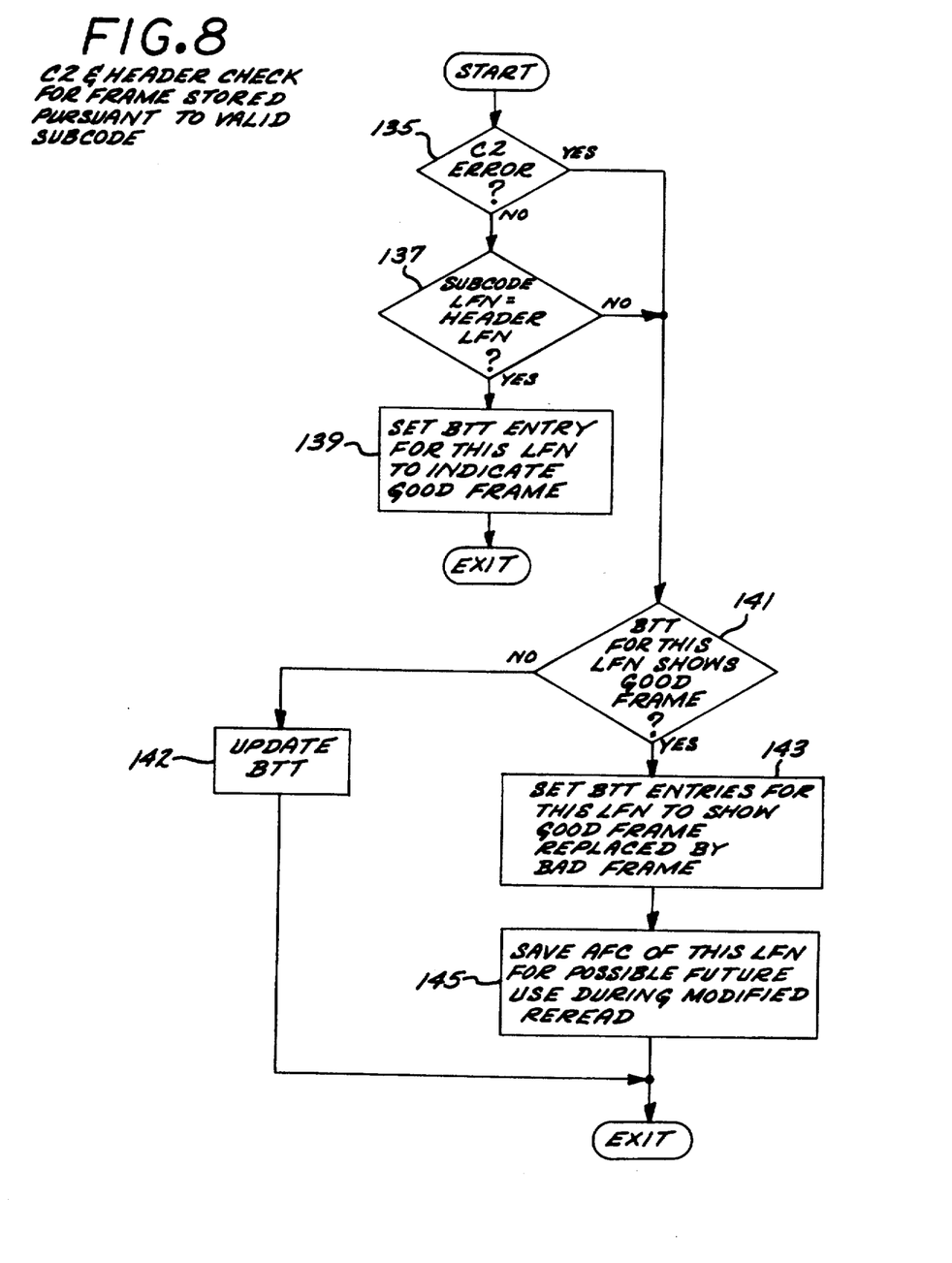
FIG. 8 is a flow diagram of a process utilized by the DAT system of FIG. 2 for checking the error status and verifying the memory location of a frame stored pursuant to valid subcode information.

Referring now to FIG. 8, shown therein is a process for checking the C2 error status and the header for a frame that was DMA transferred pursuant to a determination in FIG. 7 that the associated subcode information was valid. This process is also executed pursuant to an interrupt generated by the synchronization signal FSYNCH, for example after the subcode check process of FIG. 7. However, it should be appreciated that for the same cycle of the synchronization signal FSYNCH, the stored frame processed by the C2 and header check process of FIG. 8 will be for the frame that is two (2) frames behind the frame whose subcode information was processed with the subcode check process of FIG. 7 (e.g., C2 and header check for stored frame N-2, and subcode check for frame N in the same FSYNCH cycle).

At 135, a determination is made as to whether the C2 ECC processing by the frame processor 23 indicated an error in one of the tracks of the frame. If yes, processing goes to 141. If no track error was found at 135, a determination is made at 137 as to whether subcode LFN and the frame header LFN match. If yes, then at 139 the Bad Track Table entries for this frame are updated to indicate that both tracks are good. If the determination at 137 is that the subcode and header LFN's do not match, processing continues at 141.

At 141 a determination is made as whether the Bad Track Table entries for this frame indicates that this frame is good (e.g., pursuant to a prior read and the present read is a re-read). If no, the Bad Track Table is updated at 142 to appropriately indicate that one or zero good tracks were received, as indicated by the C2 error status. The C2 and header check process is then exited.

If the determination at 141 is yes, the Bad Track Table indicates that this frame was a good frame, at 143 the Bad Track Table entries for the present frame are updated to indicate that a good frame has been replaced by a bad frame. At 145 the AFC (absolute frame count) of the present frame is saved for use during a modified re-read process. The C2 and header check process for frames stored pursuant to valid subcodes is then exited.

Figure 9:
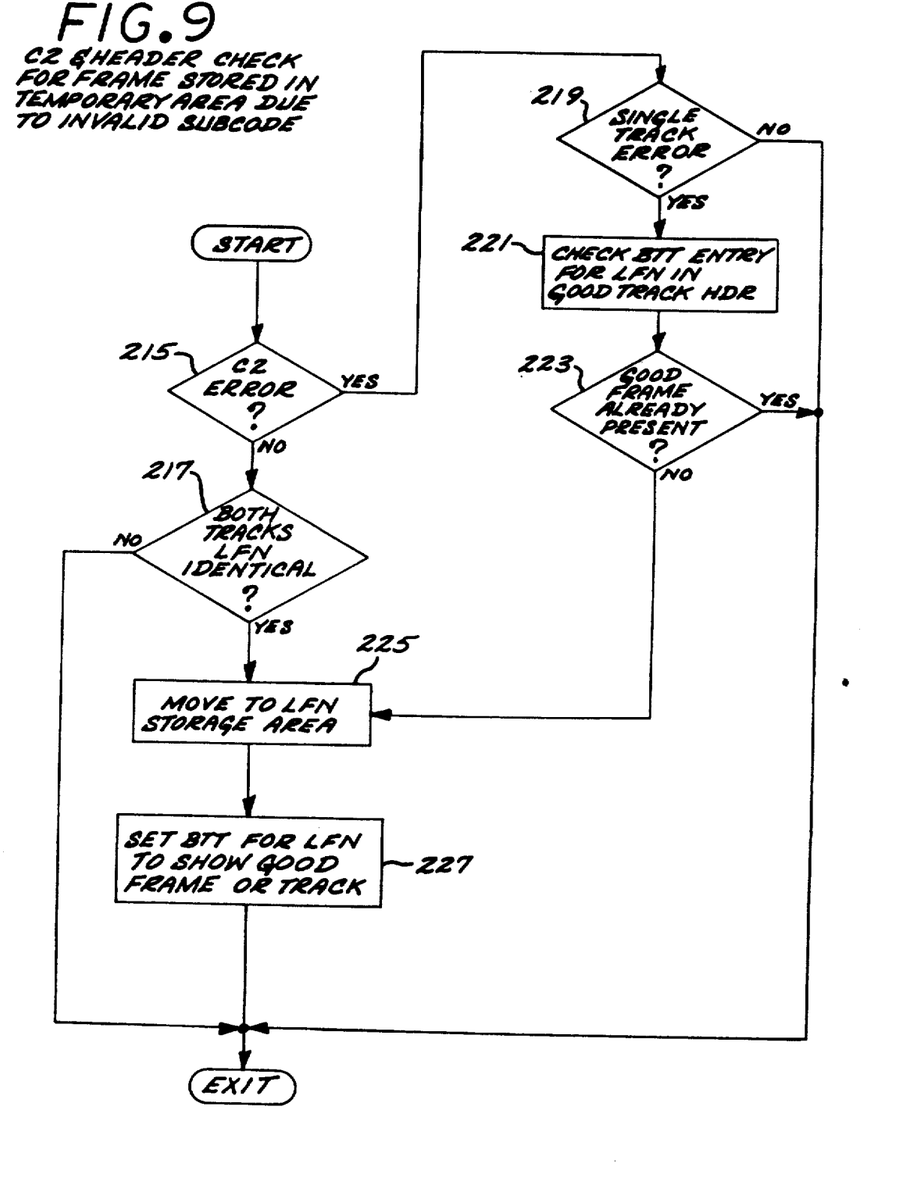
FIG. 9 is a flow diagram of a process utilized by the DAT system of FIG. 2 for checking the error status of a frame stored in a temporary frame storage area as a result of invalid subcode information.

Referring now to FIG. 9, shown therein is a process for checking the C2 error status and the header for a frame that was DMA transferred to a temporary frame storage area pursuant to a determination in FIG. 7 that the associated subcode information was not valid. This process is also executed pursuant to an interrupt generated by the synchronization signal FSYNCH, for example after the subcode check process of FIG. 7. However, it should be appreciated that for the same cycle of the synchronization signal FSYNCH, the stored frame processed by the C2 and header check process of FIG. 9 will be for the frame that is two (2) frames behind the frame whose subcode information was processed with the subcode check process of FIG. 7 (e.g., C2 and header check for stored frame N-2, and subcode check for frame N in the same FSYNCH cycle). Moreover, the process of FIG. 9 is executed only as to stored frames that were found to have invalid subcode information.

At 215 a determination is made as to whether the C2 ECC processing by the frame processor 23 for the present frame detected an error. If yes, an error was detected, a determination is made at 219 as to whether the C2 error was a single track error. If no, the process is exited, and the frame stored in the temporary storage area is effectively discarded. If the determination at 219 is yes, the C2 error was a single track error (i.e., only one track was bad), at 221 the Bad Track Table entries as indicated by the LFN from the good track are checked. At 223 a determination is made as to whether such Bad Track Table entries indicate that a good frame is already present in the group buffer. If yes, the process is exited to avoid over-writing a good frame with a bad frame. If the determination at 223 is no, control transfers to 225.

If the determination at 215 is no, there is no C2 error, a determination is made at 217 to determine if the LFN's in the frame header for the two tracks comprising the frame are the same. If yes, processing continues at 225. If the determination at 217 is no, the LFN's from both tracks are not the same, the process is exited and the frame stored in the temporary storage area is effectively discarded.

At 225 the present frame is moved from the temporary storage area to the group buffer at the address as indicated by the LFN for the frame, which can be the LFN from the good track where a single track error was found. At 227 the Bad Track Table is updated to show a good frame or a good track for the frame, depending on whether a single track error was found. The process is the exited.

To summarize the foregoing processes, during each cycle of the synchronization signal FSYNCH, the following take place:
 (a) The subcode information for frame N is being checked pursuant to the subcode check process of FIG. 6.
 (b) The frame information for the frame N-1 is being transferred by DMA to an area of a group buffer area in the random access memory.
 (c) The C2 error status and the frame header information for the frame N-2 stored in the random access memory are checked pursuant to one of the processes of FIG. 8 or FIG. 9. If the frame N-2 is stored in a temporary frame storage area and transfer to memory is determined to be appropriate, it would be transferred.

As to implementation, it has been discussed previously that the processes of FIGS. 7, 8, 9 are executed by the microprocessor 11 pursuant to an interrupt generated by the synchronization signal FSYNCH, while the DMA transfers are controlled by the Terminal Count signal TC provided by the DMA controller. For example, pursuant to an interrupt generated by FSYNCH, the process of FIG. 7 is executed, which would be followed by the process of FIG. 8 or FIG. 9, as appropriate.

The foregoing has been a disclosure of a computer data storage DAT system which has reduced memory and memory management complexity, advantageously utilizes subcode logical position identifiers, and also functions without such subcode logical position identifiers. Further, the disclosed data storage DAT system provides greater reliability since subcode information is more reliable than frame data. For example, a defect or scratch on the tape can cause an error which cannot be corrected by the frame data ECC, or a tracking problem may be such that the frame data cannot be read reliably, but the subcode information can be read reliably. In general, data reliability is increased since frame data can be assembled using either subcode information or frame data headers for control. Data can be retrieved if either the subcode information is bad or the frame data is bad. The foregoing further advantageously provides for pipeline processing of the received frames which allows for continuous and efficient processing of the tape data being played back.

Although the foregoing has been a description and illustration of specific embodiments of the invention, various modifications and changes thereto can be made by persons skilled in the art without departing from the scope and spirit of the invention as defined by the following claims.

What is claimed is:

1. In a DAT drive having a plurality of data group buffers each including indexed frame data storage locations for respective frame data of a group and also temporary frame data storage locations, a method for assembling data groups from frames reproduced pursuant to playback of a DAT tape, comprising the steps of:
 receiving a reproduced frame;

processing the reproduced frame to produce a frame header, frame data and subcode data of the reproduced frame, wherein the processing that produces the subcode data is completed before the processing that produces the frame header and frame data, whereby the subcode data is available before the frame header and the frame data, and wherein the subcode data contains a logical frame number and an absolute frame count associated with the reproduced frame and the frame header also contains the logical frame number associated with the reproduced frame;

obtaining the logical frame number of the reproduced frame from the subcode data of the reproduced frame;

determining the validity of the subcode data of the reproduced frame;

designating a destination location for later transfer of the frame data of the reproduced frame, wherein such destination location is (i) a group buffer indexed frame data storage location that corresponds to the logical frame number obtained from the subcode data if the received subcode data is valid, or (ii) a group buffer temporary storage location of the received subcode data is invalid;

transferring the frame data of the reproduced frame to the group buffer storage location designated for the frame and transferring the frame header to a frame header storage location;

obtaining the logical frame number of the reproduced frame from the frame header of the reproduced frame; and if the frame data of the reproduced frame was transferred to a group buffer temporary storage location, transferring the received frame data to the group buffer indexed frame data storage location that corresponds to the logical frame number obtained from the frame header;

whereby the frame data of the reproduced frame is stored in the group buffer indexed frame data storage location that corresponds to the logical frame number associated with the reproduced frame.

2. The method of claim 1 further including the steps of:

determining the validity of the stored frame data is invalid, determining whether the transfer of such invalid frame data to the group buffer indexed frame data storage location caused overwriting of an earlier stored valid frame data of an earlier received reproduced frame having the same logical frame number as the reproduced frame; and if storage of the invalid frame data caused the overwriting of valid frame data, storing the absolute frame count of the reproduced frame so that in the course of a subsequent re-read the invalid frame data will not be transferred to the indexed frame data storage location corresponding to the logical frame number of the reproduced frame, whereby the earlier received valid frame data will not be overwritten in the course of such re-read.

3. Apparatus for assembling data groups from tape data reproduced pursuant to playback of a DAT tape and containing frames having logical frame numbers associated therewith, comprising:

timing means for providing a frame synchronizing signal that provides three sequential timing cycles for processing each frame in the reproduced tape data;

tape data processing means for receiving the reproduced tape data and producing for each frame received therefrom a subcode data output that is available during the first timing cycle for a received frame, and a frame header and a frame data output that are available during the second timing cycle for the received frame, said subcode data output containing a logical frame number and an absolute frame count associated with the reproduced frame and said frame header also containing said logical frame number associated with the reproduced frame;

a plurality of group buffers each including indexed frame storage locations each for respective frame data of a group and also temporary frame storage locations; and frame data transfer means for (1) obtaining the logical frame number of a received frame from the subcode output of such frame and checking the validity of the subcode output of the receive frame during the first timing cycle therefor, (2) transferring the frame data for a received frame to (i) a group buffer indexed frame storage location that corresponds to the logical frame number obtained from the subcode data if the subcode data for the received frame is valid, or (ii) a group buffer temporary storage location if the subcode data for the received frame is invalid, and (3) if frame data for a received frame had been transferred to a group buffer temporary storage location, transferring such frame data from the temporary storage location to a group buffer indexed frame storage location that corresponds to the logical frame number contained in the frame header of the received frame during the third timing cycle for the frame; whereby a received frame having a valid subcode is transferred to a group buffer indexed frame storage location on the basis of the logical fame number obtained from the subcode data output for the received frame.

* * * * *